Sept. 11, 1956 A. H. POPKIN 2,762,774
POUR DEPRESSANT-DETERGENT ADDITIVE COMBINATION
Filed April 21, 1953
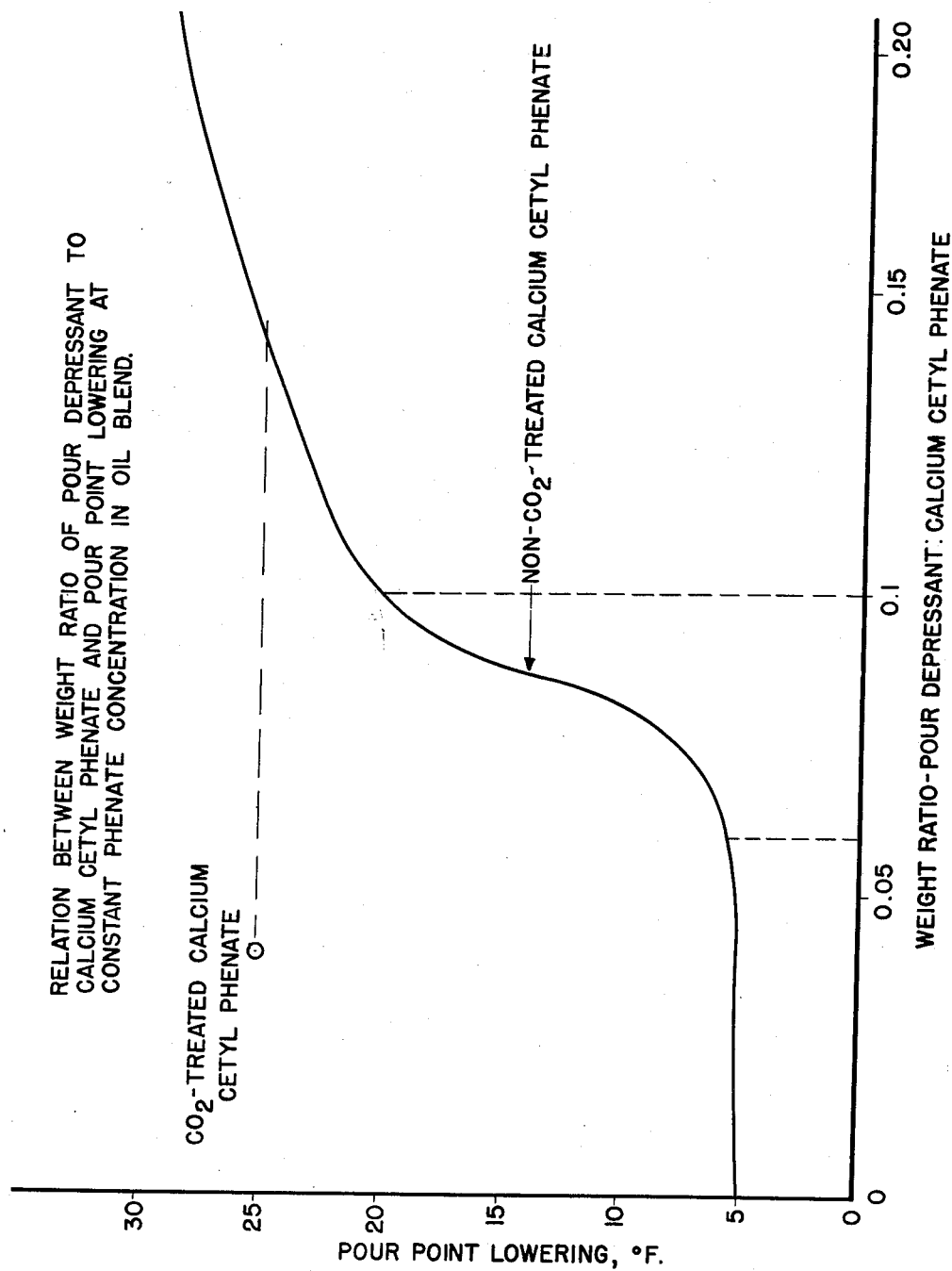
Alexander H. Popkin   Inventor
By L. F. Marx   Attorney

United States Patent Office 2,762,774
Patented Sept. 11, 1956

2,762,774
POUR DEPRESSANT-DETERGENT ADDITIVE COMBINATION

Alexander H. Popkin, Newark, N. J., assignor to Esso Research and Engineering Company, a corporation of Delaware Application April 21, 1953, Serial No. 350,135

10 Claims. (Cl. 252—42.7)

This invention relates to improved additive compositions including both detergent and pour depressant additives that are usually incompatible in certain respects. More particularly it concerns mineral lubricant compositions including certain metallo-organic additives and polymeric additives and a method for improving the compatibility of the additives.

Metal salts of phenolic materials have been used for a number of years as additives for mineral lubricant compositions, particularly for those employed in internal combustion engines. These additives either alone or in combination with metal petroleum sulfonates and the like improve the detergency characteristics of the oil, minimize the formation of harmful deposits on engine parts and improve the resistance of the oil to oxidation. These metal salts are generally used in relatively large amounts ranging as high as 10% or more by weight based on the total composition. Consequently they are one of the most expensive as well as important additives to be incorporated in a premium quality motor lubricant.

Polymeric materials, such as those obtained by the polymerization of certain esters of alpha, beta unsaturated acids or by the copolymerization of such esters with certain vinyl esters, have become increasingly important in recent years as pour depressant additives for waxy mineral lubricating oils and the like. These materials are relatively expensive, but fortunately they are quite potent in reducing the pour point of an oil even when used in extremely small concentrations.

It is frequently desired to employ these additives in combination with one another, but the metal salts impair the pour depressing potency of certain of the polymeric materials to such a great extent that prohibitively costly amounts of the polymer are required to obtain satisfactory low temperature flow properties. It has been discovered that potency of the pour depressant is not materially affected at weight ratios of polymeric material to phenolic salt above about 0.1:1.0. Below this weight ratio, the potency of the pour depressant decreases markedly and is substantially ineffective at a ratio below about 0.06:1.0.

In accordance with the present invention, it has been found that the potency of the polymeric materials contemplated herein is substantially unaffected in the critical range below about 0.1 part thereof per part of metal phenolic salt by employing a metal salt that has been treated with gaseous carbon dioxide. The improvement in compatibility is substantial since less than one-fourth as much pour depressant is required in combination with the $CO_2$-treated salt than is required with the untreated salt to obtain comparable pour point lowering. This obviously reduces materially the cost of combination additives of this type.

These results are quite unexpected since phenolic salts have frequently been used in conjunction with conventional pour depressants such as the chlorinated wax-naphthalene condensation products without potency impairment. Although it has been known to treat certain phenolic salts with acidic gases such as $CO_2$ in order to improve their water sensitivity, this treatment has had no known effect on their compatibility with other materials. The improvements noted in the present invention therefore cannot be satisfactorily explained at this time.

The benefits realized by compositing lubricant blends in accordance with this invention will be illustrated in the following examples. These examples are given for the purpose of showing preferred embodiments of the invention and are not intended to restrict the spirit or scope thereof as defined hereinafter in the specification and claims.

EXAMPLE 1.—DESCRIPTION OF PRODUCTS

*Product A.—Barium salt of alkyl phenol sulfide*

This product was a conventionally produced detergent-inhibitor additive concentrate consisting of a mixture of about 40% by weight of the barium salt of tert-octyl phenol sulfide and 60% by weight of a lubricant base stock. The concentrate analyzed about 9% barium and 3.4% sulfur.

*Product B.—Carbon dioxide-treated Product A*

A portion of Product A was blown with moist gaseous $CO_2$ for 0.5 hour at a temperature of between 120°–140° C. Approximately one weight per cent $CO_2$, based on the concentrate was used during the treating step. The $CO_2$ was moistened by bubbling it through water maintained at a temperature of about 120°–140° C. before contacting Product A.

*Product C.—Calcium cetyl phenate concentrate*

This product was a commercially available detergent-inhibitor concentrate having the approximate following composition:

| Component | Estimated Concentration, Weight Percent |
|---|---|
| 1. Basic Calcium Cetyl Phenate | 10.4 |
| 2. Zinc Dialkyl Dithiophosphate | 6.6 |
| 3. Calcium Petroleum Sulfonate | 20.0 |
| 4. Sulfurized Dechlorinated Paraffin Wax | 4.0 |
| 5. Lubricating Oil Base Stock | 59.0 |

*Product D.—Carbon dioxide-treated Product C*

A portion of Product C was blown with moist $CO_2$ for about 0.5 hour at a temperature of about 250° F. using $CO_2$ gas in excess of that required for complete absorption.

*Product E.—Polymerized methacrylate ester*

This product was a pour depressant prepared by first forming the ester of methacrylic acid and a mixture of straight chain primary $C_{10}$–$C_{18}$ alcohols derived from hydrogenated coconut oil. The ester was then polymerized in the presence of a peroxide catalyst at an elevated temperature. Product E was a 40% concentrate of active ingredient in a neutral mineral oil having an S. U. S. viscosity of 100 at 100° F. The blend had an S. U. S. viscosity at 210° F. of about 3000. The polymer per se had an average molecular weight of about 15,000.

*Product F.—"Lorol B" fumarate-vinyl actate copolymer*

This pour depressant was prepared by first forming di-"Lorol B" fumarate by conventional esterification of fumaric acid with "Lorol B" alcohols, derived from hydrogenation of coconut alcohols and consisting of primary straight chain alcohols of $C_{10}$–$C_{18}$ carbon chain length having an average length of about $C_{13.5}$. This ester and vinyl acetate were then reacted in a molar ratio of 0.7/1.0 in a lubricant base solvent and in the presence of benzoyl peroxide catalyst at a temperature of about 140°–170° F. until polymerization was substantially complete. The resulting product was diluted with more oil to a 20% concentrate (using a Mid-Continent base mineral lubricant having an S. U. S. viscosity at 210° F. of 44). The product blend had an S. U. S. viscosity at 210° F. of about 100. The copolymer per se had an S. U. S. viscosity at 210° F. of about 2500.

*Product G.—Chlorinated wax-naphthalene condensation product*

This commercially available pour depressant was a blend of mineral lubricating oil containing about 24% by weight of a conventionally produced condensation product of chlorinated wax and naphthalene.

*Product H.—Mixture of Product G and fumarate polymer*

This pour depressant was a blend of mineral lubricating oil containing about 30% of a mixture of approximately equal quantities of the active ingredient of Product G and of a "Lorol B" fumarate polymer. This pour depressant is described in U. S. 2,491,683 issued to Munday and Rogers on December 20, 1949.

EXAMPLE II.—COMPATIBILITY OF PRODUCTS IN OIL BLENDS

A series of lubricant blends were prepared containing the above products individually and in various combinations. The lubricant base stocks used in these preparations were similar solvent-extracted, Mid-Continent mineral oils of SAE–20 grade. The pour depressants were used in a concentration of 0.02–0.1% by weight of active ingredient based on the total composition. 5.0% by weight of the detergent concentrates were added to the blends. The blends were then tested for pour characteristics by the ASTM pour test. Results are shown in the following table:

polymer was not affected by the use of untreated phenolic salt.

The weight ratio of copolymer pour depressant to untreated calcium cetyl phenate in the blends is plotted against pour point lowering in the curve of the single figure. Up to a ratio of about 0.06:1.0, the combination additive gave no more improvement than was obtained with the phenate salt alone (5° F. lowering). Between ratios of 0.06 and 0.1, pour point lowering increased markedly, and then showed a gradual increase at higher ratios. The combination of copolymer and $CO_2$-treated phenate at a ratio of 0.04:1.0 is seen to give the same improvement obtained with the combination including untreated phenate at a ratio of 0.15:1.0.

The metal salts of phenolic materials used in the compositions of the present invention are preferably derived from the simple alkyl phenols or from such alkyl phenols containing sulfur substituents. The phenols have at least one benzene nucleus and at least one hydroxy group although polynuclear and polyhydroxy compounds are useful. It is preferred that at least one oil solubilizing alkyl radical, such as one having in the range of 4 to 20 carbon atoms, be attached to the ring. The benzene ring may also contain other substituents such as amino groups, alkoxy groups, acyl groups, sulfonic groups and the like.

Specific alkyl phenols include tert.-octyl phenol, decyl phenols, cetyl phenols, wax phenols and the like. Sulfur may be introduced into the compound by sulfurization before or after forming the metal salts. For example, treatment of an alkyl phenol with a sulfur halide in accordance with well known procedures will form an alkyl phenol sulfide containing one or more sulfur atoms interconnecting two benzene nuclei. Such compounds include tert.-amyl phenol sulfide, tert.-octyl phenol sulfide and the like. Sulfur may also be introduced by treating the metal salts with elemental sulfur, sulfides of phosphorus, etc.

The salts of the phenolic materials may be derived from any suitable metal that will impart detergency character-

TABLE

| Blend No. | Pour Depressant in Blend | | Phenolic Salt in Blend | | | Wt. Ratio, Pour Depressant to Phenolic Material | ASTM Pour Point of Blend, °F. | Pour Point Lowering, °F. |
|---|---|---|---|---|---|---|---|---|
| | Product No. | Amount, Wt. Percent [1] | Product No. | $CO_2$-Treated | Amount, Wt. Percent [1] | | | |
| Base Oil | | 0 | | | 0 | 0 | +20 | |
| 1 | E | 0.02 | | | 0 | 0 | −30 | 50 |
| 2 | E | 0.02 | A | No | 2.0 | 0.01 | −15 | 35 |
| 3 | E | 0.02 | B | Yes | 2.0 | 0.01 | −30 | 50 |
| Base oil | | 0 | | | 0 | 0 | +5 | |
| 4 | E | 0.02 | | | 0 | 0 | −25 | 30 |
| 5 | E | 0.02 | C | No | 0.5 | 0.04 | −5 | 10 |
| 6 | E | 0.02 | D | Yes | 0.5 | 0.04 | −25 | 30 |
| Base Oil | | 0 | | | 0 | 0 | +5 | |
| 7 | F | 0.02 | | | 0 | 0 | −20 | 25 |
| 8 | | 0 | C | No | 0.5 | 0 | 0 | 5 |
| 9 | F | 0.02 | C | No | 0.5 | 0.04 | 0 | 5 |
| 10 | F | 0.02 | D | Yes | 0.5 | 0.04 | −20 | 25 |
| 11 | F | 0.05 | C | No | 0.5 | 0.10 | −15 | 20 |
| 12 [2] | F | 0.075 | C | No | 0.5 | 0.15 | −20 | 25 |
| 13 | F | 0.10 | C | No | 0.5 | 0.20 | −25 | 30 |
| Base Oil | | 0 | | | 0 | 0 | +10 | |
| 14 | E | 0.04 | C | No | 0.5 | 0.08 | 0 | 10 |
| 15 | F | 0.04 | C | No | 0.5 | 0.08 | 0 | 10 |
| 16 | G | 0.04 | | | 0 | 0.08 | −30 | 40 |
| 17 | G | 0.04 | C | No | 0.5 | 0.08 | −30 | 40 |
| 18 | H | 0.04 | | | 0 | 0 | −30 | 40 |
| 19 | H | 0.04 | C | No | 0.5 | 0.08 | −30 | 40 |

[1] Active ingredient.
[2] Interpolated.

In the cases where the untreated phenolic salt was used in conjunction with the copolymer (Product F) or the methacrylate ester polymer (Product E), the potency of the depressant was materially reduced. The $CO_2$-treated phenolic salt, however, did not affect the pour depressing properties of either Product E or Product F. On the other hand, the pour depressing potency of either the conventional chlorinated wax-naphthalene condensation product or of mixtures containing it and a fumarate istics to the finished compound. The alkaline earth metals, especially barium and calcium, are particularly useful. The salts are generally formed by treating the phenolic material with an amount of a basic reacting metal compound, such as the hydroxide or oxide, at least sufficient to neutralize the phenolic material. Superior detergents may be formed by using a stoichiometrical excess of the neutralizing agent in order to form basic salts containing an excess of metal.

The metal salt is treated with gaseous carbon dioxide, generally with an amount in the range of about 0.2 to 5% by weight based on the metal salt, although smaller or larger amounts may be used under some circumstances. As a rule, an amount of $CO_2$ in excess of that required for complete absorption in the treated material will be sufficient. The treating temperature will generally range from about 50° to 200° C., but is preferably maintained above about 100° C. in order to remove water from the salt and to maintain effective treating conditions. Water or steam is preferably added during the treating step, either extraneously or admixed with the carbon dioxide. This treating step may be carried out in batch or continuous systems usually with mechanical agitation. The metal phenolic material per se, this material in solution in a solvent such as a lubricating oil, or its mixtures with other additives such as alkaline earth metal petroleum sulfonates, the polymeric pour depressants of the present invention, and the like, may be $CO_2$-treated to form the improved additives.

The carbon dioxide-treated metal salts of the phenolic materials are generally used in lubricant compositions in amounts ranging from about 0.1 to 10%, preferably 0.2 to 5.0%, by weight based on the total composition. The lower amounts are generally used if auxiliary detergent-inhibitors such as metal petroleum sulfonates are used in combination therewith. For example, metal petroleum sulfonates may be used in amounts ranging from about 0.1 to 5.0% by weight, based on the oil blend.

The polymeric pour depressants of the present invention are those obtained by the polymerization of higher molecular weight esters of alpha, beta unsaturated carboxylic acids, or by the copolymerization of such esters with a vinyl compound. The higher esters to be polymerized are preferably those of mono-carboxylic acids such as acrylic acid or one of its alpha alkyl substitution products. Methacrylic acid esters are especially preferred. The higher esters used in the copolymerization reaction are preferably diesters of dicarboxylic acids such as maleic and fumaric acids.

The ester groupings in the higher molecular weight compounds are preferably derived from aliphatic, monohydroxy alcohols having in the range of about 8 to 18 carbon atoms in order to achieve optimum pour depressing potency. Specific alcohols include decyl, dodecyl, tetradecyl, hexadecyl and the like alcohols, the straight chain alcohols generally being more effective than the branched derivatives. Primary alcohols are preferred. Mixtures of alcohols having an average of from 11.5 to 14 carbon atoms are especially preferred. Suitable typical mixtures are those manufactured and marketed by E. I. Du Pont de Nemours Company under the tradenames "Lorol-5" and "Lorol B." These mixtures contain normal, aliphatic, saturated monohydric alcohols containing 10 to 18 carbon atoms.

Various vinyl compounds may be used in the copolymerization reaction. These include vinyl esters having from 4 to 20 carbon atoms and usually prepared from fatty acids having from 2 to 18 carbon atoms, such as vinyl acetate, vinyl butyrate, vinyl laurate, vinyl coconate, etc., although lower esters such as vinyl acetate are especially preferred. Other vinyl compounds include styrene and its derivatives, acrylonitrile, isopropenyl acetate, etc. Mixtures containing the higher esters mentioned above and in the range of 10 to 90% of the vinyl compound may be copolymerized.

The polymerization and copolymerization reactions may be varied over rather wide ranges to obtain potent pour depressants having average molecular weights in the range of about 1,000 to 35,000. Temperatures may range from about room temperature up to 250° F., preferably 120°–180° F. The reaction is continued for from 1 to 50 hours, generally 12 to 24 hours being suitable. A small amount of peroxide catalyst, such as 0.05 to 3% by weight, based on the reactants, is generally used. Such catalysts include benzoyl peroxide, cumene hydroperoxide, lauroyl peroxide, etc. The reaction usually proceeds better when carried out in a suitable solvent such as mineral oil naphthas, lubrication oils, white oils, benzene, etc.

The polymerization and copolymerization reactions are described in such patents as U. S. 2,091,627 to Bruson and U. S. 2,602,048 to Michaels et al., and in copending U. S. applications Serial No. 303,827, filed on August 11, 1952, for Munday et al., now Patent No. 2,666,746, and Serial No. 303,830, filed August 11, 1952, for J. H. Bartlett, now Patent No. 2,694,685.

These polymeric materials are usually blended as 20–40% concentrates of active ingredient in mineral lubricating oil. The viscosities of these concentrates may range from as low as 50 up to 3,000 or higher S. U. S. at 210° F. depending on the type and molecular weight of the polymer and the concentration thereof in the oil. The above polymers and copolymers are employed in extremely small amounts in lubricant compositions containing the carbon dioxide-treated salts. Thus, in the range of about 0.003 to 1.0% by weight, more usually 0.01 to 0.1% of active ingredient, based on the total composition, will generally be sufficient to obtain effective lowering of the pour point while staying below the critical weight ratio range of 0.1:1.0 polymeric material to treated salt.

The additives of the present invention may be employed in ordinary mineral lubricating oils as well as in those that have been refined by well known means. The compositions may also contain other types of additives to improve stability, detergency, oiliness and other characteristics. Such additives include metal petroleum sulfonates, metal organo-phosphates and thiophosphates, sulfurized hydrocarbons such as sulfurized waxes, and the like.

What is claimed is:

1. A mineral lubricating oil of improved pour and detergency characteristics having combined therewith in the range of 0.01 to 0.1 by weight of a pour point depressing polymeric material selected from the group consisting of polymers of a methacrylate ester, copolymers of a maleate ester and a vinyl compound and copolymers of a fumarate ester and a vinyl compound, said ester portions containing in the range of 8 to 18 carbon atoms, and said vinyl compounds having in the range of 4 to 20 carbon atoms, and in the range of about 0.2 to 5.0% by weight of a carbon dioxide-treated oil-soluble alkaline earth metal salt of a phenolic compound, the weight ratio of said polymeric material to said treated metal salt being below about 0.06:1.0, said salt having been treated with carbon dioxide until an appreciable amount of carbon dioxide has been absorbed.

2. An oil as in claim 1 wherein said phenolic compound is an alkyl phenol.

3. An oil as in claim 2 wherein said alkaline earth metal is calcium.

4. An oil as in claim 1 wherein said phenolic compound is an alkyl phenol sulfide.

5. An oil as in claim 4 wherein said alkaline earth metal is barium.

6. An oil as in claim 1 wherein said salt has been treated with moist carbon dioxide in an amount in the range of about 0.5 to 5.0% by weight based thereon at a temperature in the range of about 50° to 200° C.

7. An oil as in claim 6 wherein said salt is calcium cetyl phenate and wherein said treatment is carried out on a mixture containing said salt and oil soluble calcium petroleum sulfonate.

8. A mineral lubricating oil composition of improved pour and detergency characteristics having combined therewith in the range of 0.01 to 0.1% by weight of a polymer of an ester of methacrylic acid and a mixture of $C_{10}$–$C_{18}$ alcohols derived from hydrogenated coconut oil, and in the range of 0.2 to 5.0% by weight of moist carbon dioxide-treated barium tert.-octyl phenol sulfide, the weight ratio of said polymer to said phenol sulfide being below about 0.06:1.0, said phenol sulfide having been treated with carbon dioxide until an appreciable amount of carbon dioxide has been absorbed.

9. A mineral lubricating oil composition of improved pour and detergency characteristics having combined therewith in the range of 0.01 to 0.1% by weight of a polymer of an ester of methacrylic acid and a mixture of $C_{10}$–$C_{18}$ alcohols derived from hydrogenated coconut oil, and in the range of 0.2 to 5.0% by weight of moist carbon dioxide-treated calcium cetyl phenate, the weight ratio of said polymer to said calcium cetyl phenate being below about 0.06:1.0, said phenate having been treated with carbon dioxide until an appreciable amount of carbon dioxide has been absorbed.

10. A mineral lubricating oil composition of improved pour and detergency characteristics having combined therewith in the range of 0.01 to 0.1% by weight of a copolymer of a fumaric ester and vinyl acetate, said ester portion being derived from a mixture of $C_{10}$–$C_{18}$ alcohols obtained from hydrogenated coconut oil, and in the range of 0.2 to 5.0% by weight of moist carbon dioxide-treated calcium cetyl phenate, the weight ratio of said polymer to said calcium cetyl phenate being below about 0.06:1.0, said phenate having been treated with carbon dioxide until an appreciable amount of carbon dioxide has been absorbed.

References Cited in the file of this patent

UNITED STATES PATENTS

| | | |
|---|---|---|
| 2,402,448 | Richards | June 18, 1946 |
| 2,406,041 | Schneider | Aug. 20, 1946 |
| 2,600,451 | Van Horne et al. | June 17, 1952 |
| 2,602,048 | Michaels et al. | July 1, 1952 |
| 2,616,851 | Giammaria | Nov. 4, 1952 |